US011412887B2

(12) United States Patent
Wilcox et al.

(10) Patent No.: US 11,412,887 B2
(45) Date of Patent: Aug. 16, 2022

(54) COMPACT PACKABLE COOKING SYSTEM

(71) Applicants: Adam Emery Wilcox, Candia, NH (US); Michael Edward Hebert, Jr., Milford, NH (US); Michael Steven Siopis, Londonderry, NH (US); Ryan Paul Chartier, Manchester, NH (US)

(72) Inventors: Adam Emery Wilcox, Candia, NH (US); Michael Edward Hebert, Jr., Milford, NH (US); Michael Steven Siopis, Londonderry, NH (US); Ryan Paul Chartier, Manchester, NH (US)

(73) Assignee: Johnson Outdoors Inc., Racine, WI (US)

( * ) Notice: Subject to any disclaimer, the term of this patent is extended or adjusted under 35 U.S.C. 154(b) by 214 days.

(21) Appl. No.: 17/064,335

(22) Filed: Oct. 6, 2020

(65) Prior Publication Data
US 2022/0104653 A1    Apr. 7, 2022

(51) Int. Cl.
*A47J 36/26*  (2006.01)
*F24C 3/14*   (2021.01)
*A47J 36/06*  (2006.01)

(52) U.S. Cl.
CPC ............ *A47J 36/26* (2013.01); *F24C 3/14* (2013.01); *A47J 36/06* (2013.01)

(58) Field of Classification Search
CPC .. A47J 36/34; A47J 36/26; A47J 36/06; F24C 3/14
See application file for complete search history.

(56) References Cited

U.S. PATENT DOCUMENTS

| 4,105,013 | A | 8/1978 | Vache |
| 5,514,075 | A * | 5/1996 | Moll ............ A61B 90/50 606/198 |
| D610,390 | S | 2/2010 | Nishijima |
| 2004/0011350 | A1 | 1/2004 | Dowst et al. |
| 2006/0162571 | A1 | 7/2006 | Dowst et al. |

(Continued)

FOREIGN PATENT DOCUMENTS

EP    1897474 A1    3/2008

OTHER PUBLICATIONS https://www.joybuy.com/694718724.html—Lixada Super Lightweight Mini Pocket Outdoor Cooking Burner Folding Camping Gas Stove 3000W. Retrieved Jan. 6, 2021.

(Continued)

*Primary Examiner* — Alfred Basichas
(74) *Attorney, Agent, or Firm* — Reinhart Boerner Van Deuren P.C.

(57) ABSTRACT

A packable cooking system is provided. To pack the system, the fuel canister is connected to the lid. The legs of the fuel stabilizer are folded and it is placed in the bottom of the pot. The pot support legs of the burner are rotated to their storage position forming an L-shape with the burner mixer tube and the folded burner assembly is placed in the bottom of the pot with the pot support legs along the bottom and side walls of the pot and the burner mix tube extending upward from the bottom of the pot along the side wall. This orientation, when the connection is off-center, allows the fuel canister that has been secured to the lid to fit within the pot in its offset position beside the upward extending burner mix tube with the folded fuel stabilizer below the fuel canister.

20 Claims, 9 Drawing Sheets

(56) References Cited

U.S. PATENT DOCUMENTS

| | | |
|---|---|---|
| 2008/0029082 A1 | 2/2008 | Dowst et al. |
| 2014/0290640 A1 | 10/2014 | Kim |
| 2016/0298854 A1* | 10/2016 | Kuhn ...................... F24B 1/022 |
| 2017/0143161 A1* | 5/2017 | Masterson .............. A47J 36/26 |
| 2017/0219214 A1* | 8/2017 | Kuhn ........................ F24C 1/16 |

OTHER PUBLICATIONS https://www.msrgear.com/stoves/canister-stoves/pocketrocket-2-stove/09884.html—PocketRocket® 2 Stove. Retrieved Jan. 6, 2021.

\* cited by examiner

COMPACT PACKABLE COOKING SYSTEM

FIELD OF THE INVENTION

This invention generally relates to portable outdoor stoves, and more particularly to a packable backpacking cooking system that houses all of its components in a single package.

BACKGROUND OF THE INVENTION

One type of portable stove that is popular for backpacking and camping is referred to as a canister stove because they utilize closed fuel canisters that contain pre-pressurized gaseous fuel. Such canister stoves can be very small, fold up compactly, and weigh only a few ounces, which makes them ideal when having to carry gear.

One downside of canister stoves is that their cooking vessel support arms must be unfolded from their stowed position and secured in place in order to safely support the cooking vessel and its contents. In some designs, the legs are mounted to the burner's mixing tube by members that stick out to the side to allow over-center rotation of the legs so that they may rest on a shoulder of the member to support the cooking vessel. Unfortunately, these members increase the overall size and weight of the stove, which decreases its desirability from both a packable volume and weight perspective.

Other designs on the market utilize clips to hold the legs in their deployed position. While such clips add less weight than the support members, if not properly secured to the legs, a safety issue may be presented when the cooking vessel and its contents are placed on the legs. Further, because these legs are still folded down along the mix tube of the burner, such designs also suffer from a larger packed volume that limit the ability to pack other gear.

Stand-alone canister stoves that require the user to supply the cooking vessel also suffer from the fact that their arms may not be long enough to hold a user supplied large pot securely. This is particularly true when the diameter of the cooking vessel exceeds that of the fuel canister or when used on a less than level surface.

In order to overcome such problems, integrated canister systems have been introduced. Such integrated systems provide a burner that screws onto the fuel canister and pairs perfectly with a cooking pot and a lid with a pour/sip hole. Such systems also include a fuel stabilizer that connects to the fuel canister and increases the stability of the system when cooking. In such integrated systems, the fuel canister, fuel stabilizer, and burner can be vertically placed inside the tall cooking pot and contained by the lid to form a single, packable package with everything needed for cooking on the trail or at camp. Such integrated systems are available from the assignee of the present application and sold under the Jetboil® brand.

While such currently available integrated canister cooking systems provide many advantages, hikers and campers continue to demand reductions in size and weight to allow them to pack additional gear within their carrying limits or to travel further by carrying the same gear with less weight.

Embodiments of the compact packable cooking system of present invention provides such size and weight reductions in an integrated canister cooking system. These and other advantages of the invention, as well as additional inventive features, will be apparent from the description of the invention provided herein.

BRIEF SUMMARY OF THE INVENTION

In one aspect, embodiments of the present invention provide an integrated canister cooking system that overcomes one or more of the above described problems existing in the art.

In one embodiment, the lid of the integrated canister cooking system holds the fuel canister, preferably in an off-center position within the cooking pot. This configuration reduces the potential for metal-to-metal contact between the fuel canister and the cooking pot, which reduces or eliminates rattling and possible staining, and in the preferred embodiment opens up an envelope that extends along the side wall of the pot beside the off-center-held canister of fuel. This envelope could not hold the burner base if the prior folding leg design were used due to the increase in exterior dimension discussed above when the legs are folded down for storage. However, in an embodiment of the present invention, this off-center containment of the fuel canister by the lid can accommodate the burner because it is reconfigured to be longer (taller) and nests its cooking vessel support legs to one side at the end. This resulting L-shaped configuration is then able to be housed as discussed.

In one embodiment, utilization of a longer burner base allows the use of aluminum instead of steel for its construction. With the taller configuration of the burner base of this embodiment, because it is farther from the flame, aluminum can be used even though it has a higher thermal conductivity than steel. This provides the added benefit of being lighter. So, while other integrated canister cooking systems in the field have similar parts, embodiments of the present invention can pack them all together in a smaller envelope that weighs less. One advantage leads to another, which leads to another in embodiments of the present invention.

In embodiments of the present invention, the design features allow for extremely compact packing to provide maximum efficiency and space savings. The lid is designed to snap fit onto fuel canister. This assists the user in packing embodiments of the present invention by positioning the fuel canister within the pot so space of ideal size and shape remains for the burner base. The lid is also designed to hold fuel canister in the lid to eliminate the fuel canister from contacting the cookpot. This also allows space under the canister within the pot to store the fuel stabilizer, and in certain embodiments, the burner base.

Advantageously in embodiments of the present invention, the pot support legs of the burner are designed to rotate sideways about the axis of the burner for storage. A single large joint simplifies the design and minimizes part count. By folding to the side and adding a sideways bend in the legs, they fit the tall, curved space between the fuel can and cookpot wall when packed. The combination of the two design elements provide a unique packing methodology for a highly compact system.

The pot support leg design of certain embodiments is a hybrid between a universal cookware-compatible approach and a cookware/burner integrated connection. This provides a unique dual benefit, to wit, it maximizes performance (efficiency) by ensuring self-centered system cook pot as part of the integrated canister cooking system, and it also is compatible with flat bottom cookware without the use of accessories or adapters.

Embodiments of the present invention are lightweight and utilize a gram strategy. This gram strategy is applied to embodiments of the present invention and the resulting design and arrangement of parts is unique. Specifically, each part is scrutinized for non-essential material recognizing that small savings add up. In one embodiment the system utilizes a cast aluminum handle bracket. Commonly, this part is made of stamped stainless steel sheet metal. By casting it from aluminum a more complex shape with lighter weight and better hinging/locking function is achieved. This strategy also resulted in a reduced cook pot wall thickness to eliminate weight, and utilizes titanium on the burner head for additional weight savings. Further, the mix tube is made of lightweight aluminum instead of Stainless Steel in preferred embodiments as discussed above.

In one embodiment, the cooking system of the present invention utilizes a direct pressure, butane-propane mixture. Preferably, the fuel canister conforms to the EN417 or AS2278 standard. Embodiments of the present invention may advantageously utilize 100 g/230 g/450 g Jetboil Jetpower Isobutane/Propane Fuel Canisters available from the assignee of the instant application.

In an embodiment, the packaged cooking system made in accordance with the teachings of the present invention may be unpacked for use by first removing the packed contents from pot. Next, the user may unfold the bail from the valve body. For safety reasons, the user should next close the control valve by, in one embodiment, turning the bail clockwise. The user would then check for debris in the valve connection, and that the O-Ring is in place and in good condition before connecting to the canister. The user then connects the fuel canister to the valve by threading the two together. The user would then unfold the stabilizer legs and securely attach the stabilizer to the fuel canister. The fuel canister will snap into the stabilizer grips. Thereafter, the user unfolds the pot support legs fully. The user may then place the assembled stove on a flat, level surface, at least 1 m/3.3 ft away from any combustible materials or ignition sources.

The user would then add water or contents into the pot, open the valve fully and ignite the flame. The pot with its contents may then be placed onto the burner and the flame may be lowered as needed. Once the contents of the pot have been fully heated, the flame may be turned off, the pot removed, and the contents consumed.

In one embodiment, in order to pack the cooking system after it has cooled and the pot has been cleaned, the components thereof are disconnected from each other. The fuel canister is then connected and secured to the lid. In a preferred embodiment, the fuel canister is secured to the lid in an off-center position. A small lighter, e.g. a mini lighter or mini pocket lighter, may be accommodated between the bottom of the fuel canister and the lid in certain embodiments. The legs of the fuel stabilizer are folded, and the fuel stabilizer is placed in the bottom of the pot. The pot support legs of the burner are rotated to their storage position, the bail is folded to its storage position, and the folded burner assembly is then placed in the bottom of the pot with the pot support legs along the bottom and side walls of the pot and the burner mix tube extending upward from the bottom of the pot along the side wall. This orientation will allow the fuel canister that has been secured to the lid to fit within the pot in its off-center position, in a preferred embodiment, beside the upward extending burner mix tube with the folded fuel stabilizer below the fuel canister. Once the lid is secured onto the pot, the pot handle is flipped over the lid to finish the packing of the compact packaged cooking system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there is illustrated an embodiment of a compact packable cooking system constructed in accordance with the teachings of the present invention. While the following description will utilize the embodiment shown in the numerous drawings, those skilled in the art will recognize that the scope of the invention is not limited to the illustrated embodiment, and that such embodiment and description thereof should be taken by way of example and not by way of limitation.

Figure 1:
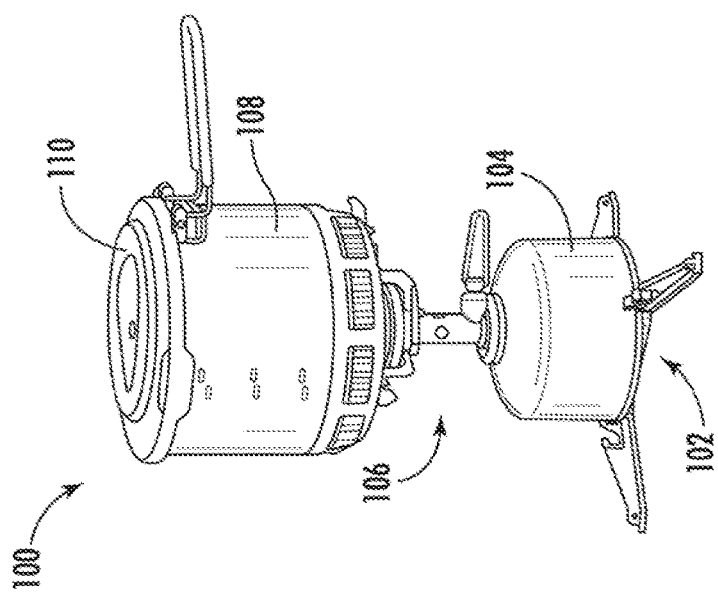
FIG. 1 is an isometric illustration of an embodiment of a compact packable cooking system constructed in accordance with the teachings of the present invention, fully assembled for utilization.

With this in mind, attention is directed to FIG. 1 wherein a fully assembled packable cooking system 100 is illustrated in its fully assembled, ready to use form. This system 100 preferably includes a fuel stabilizer 102 that is attached to the fuel canister 104. A burner assembly 106 is attached to the fuel canister 104 and supports the cooking vessel or pot 108 thereon. The pot 108 is covered with a lid 110 to complete the fully assembled packable cooking system 100.

Figure 3:
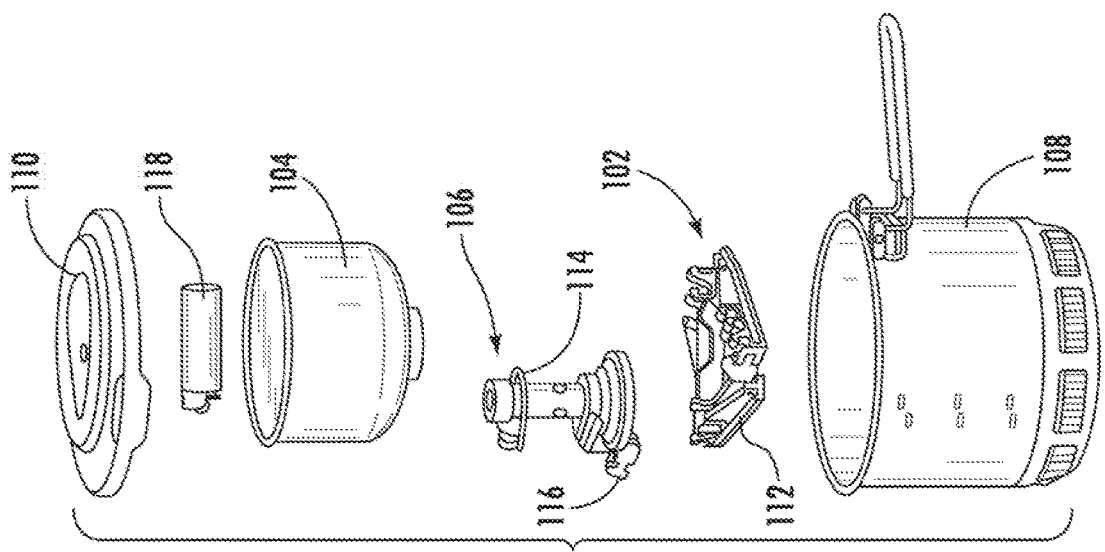
FIG. 3 is an exploded isometric illustration of the compact packable cooking system of FIG. 1 disassembled and in a packable state, including a disposable lighter.
Figure 2:
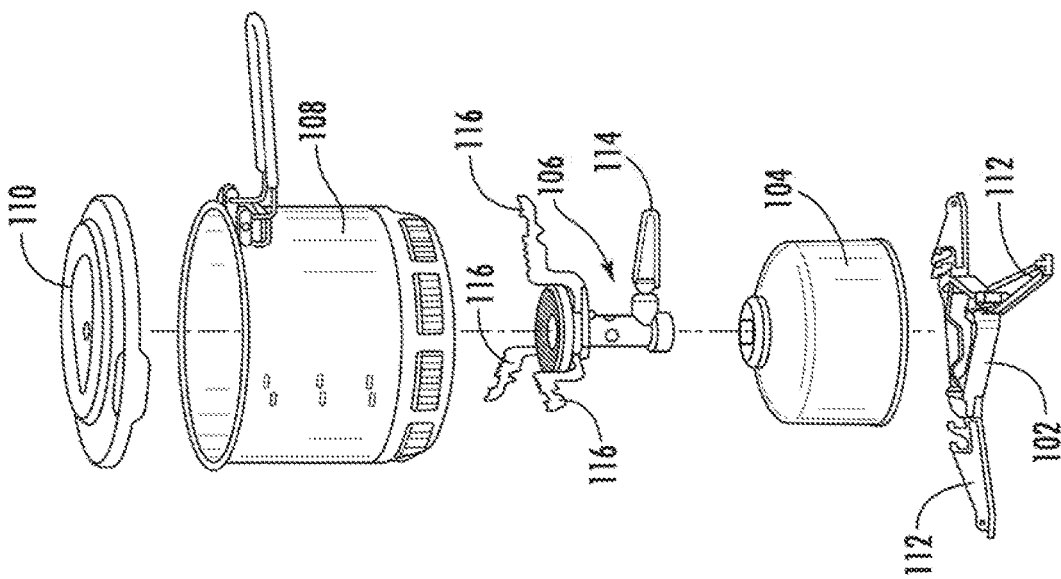
FIG. 2 is an exploded isometric illustration of the compact packable cooking system of FIG. 1 disassembled but in a deployed state.

In order to pack the cooking system 100 for transport, the components are disassembled as shown in the exploded isometric view of FIG. 2. Once disassembled, various components are manipulated in order to place them in their stowable condition ready for packaging. Specifically, the legs 112 of the fuel stabilizer 102 are rotated into their storage position along the main body of the stabilizer 102 as shown in FIG. 3. The bail 114 of the burner assembly 106 is folded over into its stowed position, and each of the pot support legs 116 are rotated about the longitudinal axis of the burner assembly 106 into their stowed position, forming an L-shaped configuration. FIG. 3 also illustrates that the fuel canister 104 is inverted so that it may be attached to the lid 110 for storage. FIG. 3 also illustrates a particular advantage of the illustrated embodiment in that a lighter 118 may also be stowed between the lid 110 and the fuel canister 104 so as to be available to the user when needed.

Figure 6:
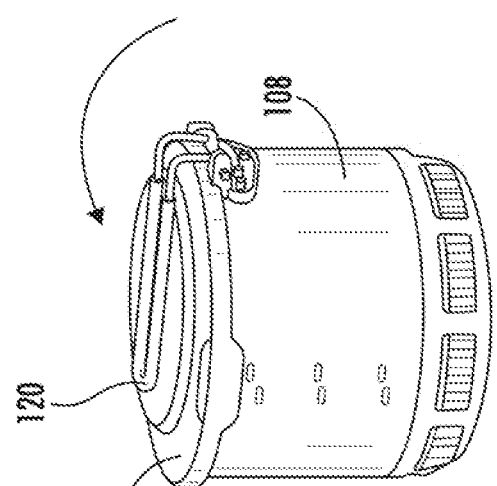
FIG. 6 is an isometric illustration of the compact packable cooking system of FIG. 1, full packed for transport.
Figure 5:
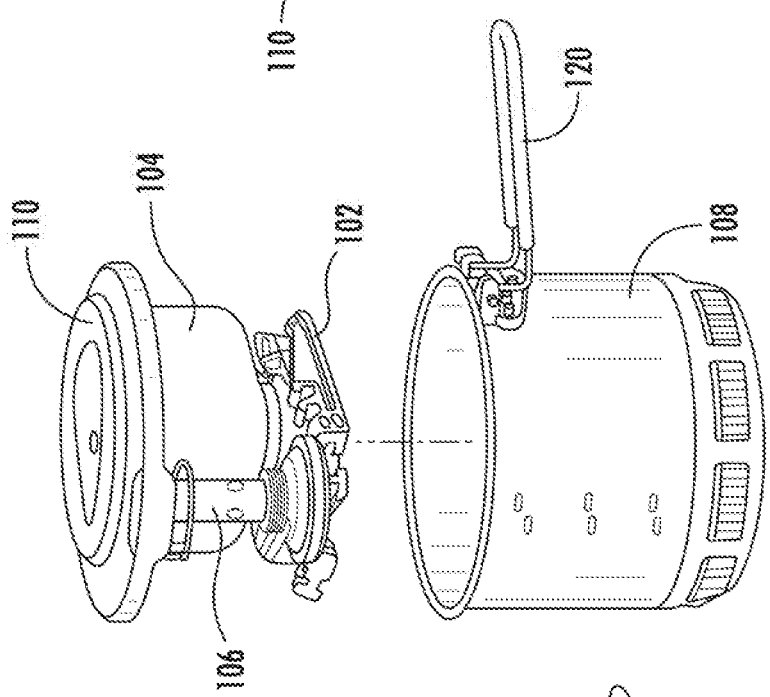
FIG. 5 is a partially exploded isometric illustration of the compact packable cooking system of FIG. 1 disassembled and partially packed to show the relative orientation of the components as they will be orientated in the pot.
Figure 4:
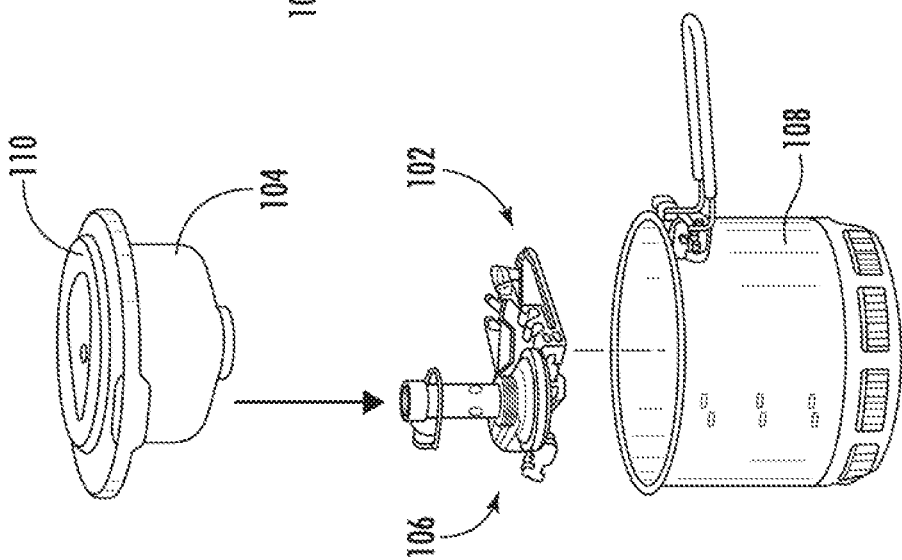
FIG. 4 is a partially exploded isometric illustration of the compact packable cooking system of FIG. 1 disassembled and partially packed.
Figure 9:
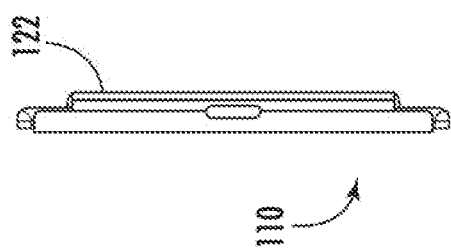
FIGS. 7-11 are five standard views of an embodiment of a lid of the compact packable cooking system of FIG. 1.
Figure 8:
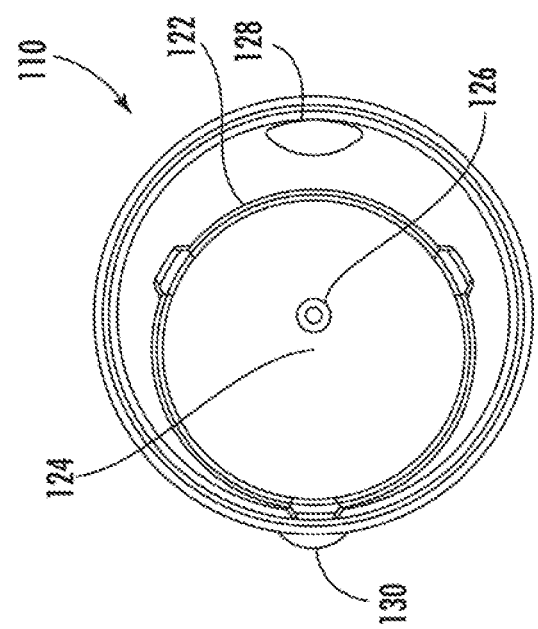
Figure 11:
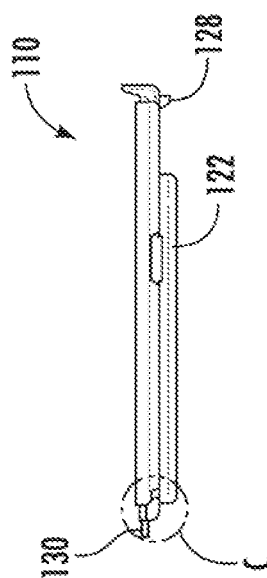
Figure 7:
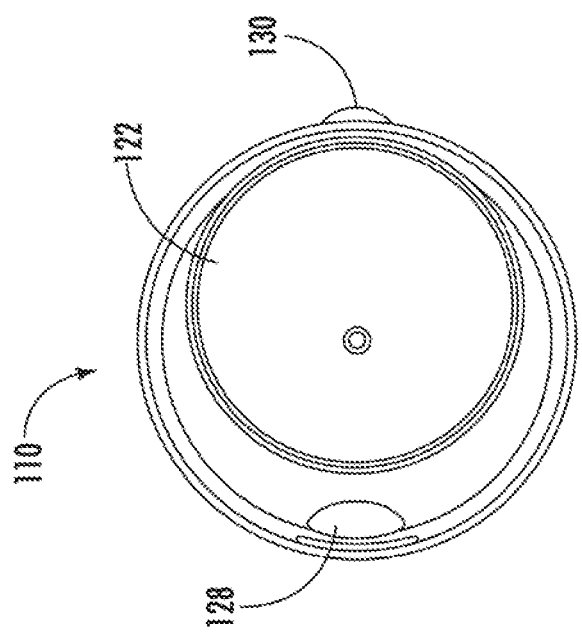
Figure 10:
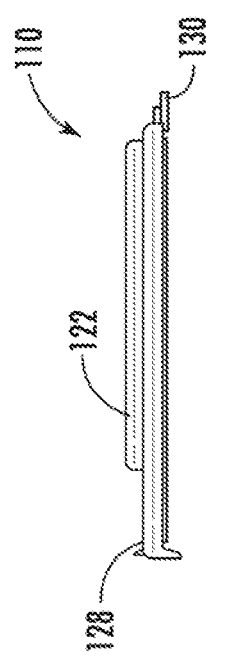

Turning now to FIG. 4, it can be seen that the burner assembly 106 and the fuel stabilizer 102 are positioned so as to accommodate the fuel canister 104 that is attached to the lid 110 for storage in the pot 108. This accommodation between the components may best be seen with reference to FIG. 5 wherein the relative positioning and orientation of the lid 110, pot 108, burner assembly 106, and fuel stabilizer 102 are shown. As may be appreciated from the illustration of FIG. 5, these components will fit nicely into pot 108. To complete the packing of the cooking system 100, the handle 120 is rotated from its deployed position over the top of the lid 110 to its stowed position as shown in FIG. 6.

While the proceeding describes the disassembly and packaging of the components of the packable cooking system 100 of an embodiment of the present invention, those skilled in the art will recognize that the un-packaging of the components and assembly of the cooking system 100 for use follows an essentially reversed operation with some safety checks along the way to ensure safe and efficient operation once assembled, e.g. ensuring that the bail is rotated to close the fuel control valve in the burner assembly prior to attaching to the fuel canister.

With the above description in mind, and before discussing the individual components in detail, it is instructive to consider the novel features and design trade-offs that led to the advantages provided by the packable cooking system 100 of the present invention. In particular, it is known that aluminum is lighter than stainless steel, and therefore there is a natural motivation to utilize such lightweight materials in the construction of hiking and camping equipment, which must be carried often over long distances. Unfortunately, such lightweight materials also typically have a higher thermal conductivity which makes their use particularly problematic in equipment such as stoves where temperatures are purposefully elevated to allow for the cooking operation.

In embodiments of the present invention, it was recognized that a longer burner base mix tube would allow for aluminum to be utilized in view of the fact that the distance from the actual burner surface would be increased and thereby reduce the possibility of higher thermal conductivity of the aluminum to conduct the heat to the user actuated valve would alter its performance or make it too hot to touch. However, increased height resulting from the increased length of the burner assembly is discouraged in such cooking systems because it can tend to increase the instability since the load of the cooking pot is placed higher from the ground. Such risks would typically be unacceptable particularly when used in a camp environment where the surface on which the stove is placed cannot be ensured to be perfectly level. The increased height of the burner assembly, therefore, would place the load of the pot at a greater distance from the supporting surface increasing the torque arm that may destabilize the stove.

However, preferred embodiments of the present invention do not suffer from such potential of increased instability because it was recognized that the cooking pot could be modified to be shorter and wider from those of a typical system wherein all of the components stacked vertically within the pot. Use of the fuel stabilizer also decreases the possibility of instability despite the taller burner assembly. However, because the size of the fuel canister is standardized, the room between its sidewalls and the interior sidewalls of the cooking pot is increased somewhat.

However, this increase in distance between the sidewalls of the pot and the fuel canister is not large enough to accommodate the prior non-integrated canister stove burner assemblies that typically require the pot support legs to fold into a stowed position along the axial length of the burner assembly. This is because the presence of those pot support legs along the exterior axial length of the mixer tube of the burner assembly increases the outer diameter of the stowed burner assembly such that it cannot be accommodated in a reasonably sized pot other than in a vertical stacked configuration which, just discussed, might raise instability issues.

However, with the burner assembly of embodiments of the present invention, the pot support legs do not rotate in a manner to be stowed along the outer exterior of the axial length of the burner assembly, but instead rotate about the axis of the burner assembly so as to form a stowed L-shaped configuration. This configuration allows for accommodation of the stowed burner assembly beside the fuel canister along the inner wall of the pot with the pot support legs along the bottom of the pot below and to the side of the fuel canister. To enable this accommodation, however, the fuel canister is affixed to the lid so as to be held in position off-center of the pot and lid, and off of the bottom of the pot so as to provide an area thereunder for storage of the fuel canister stabilizer and the pot support legs.

As may now be clear, the design of embodiments of the present invention adopt design features that are cautioned against by conventional wisdom in the art in order to achieve the significant benefits of lower weight, more compact storage, and increased stability and utility in operation.

Turning now to FIGS. 7-11, there are illustrated standard engineering views of the lid 110 of a preferred embodiment of the packable cooking system of the present invention. As may be seen in the top view illustration of FIG. 7, the lid 110 includes an off-center circular fuel canister attachment structure 122 whose center is offset from the overall center of the lid. This center offset may best be seen in FIG. 8 wherein the canister attachment structure 122 center 124 is displaced from the center 124 of the lid 110 itself. In the illustrated preferred embodiment, the canister attachment structure 122 of the lid 110 is positioned near the outer periphery of the lid opposite the pour aperture 128 near the removal tab 130, although the relative positioning of these three structures 122, 128, 130 may vary in different embodiments. That being said, the offset does provide the area accommodation for the burner assembly beside the fuel canister that is attached to the canister attachment structure 122.

Figure 12:
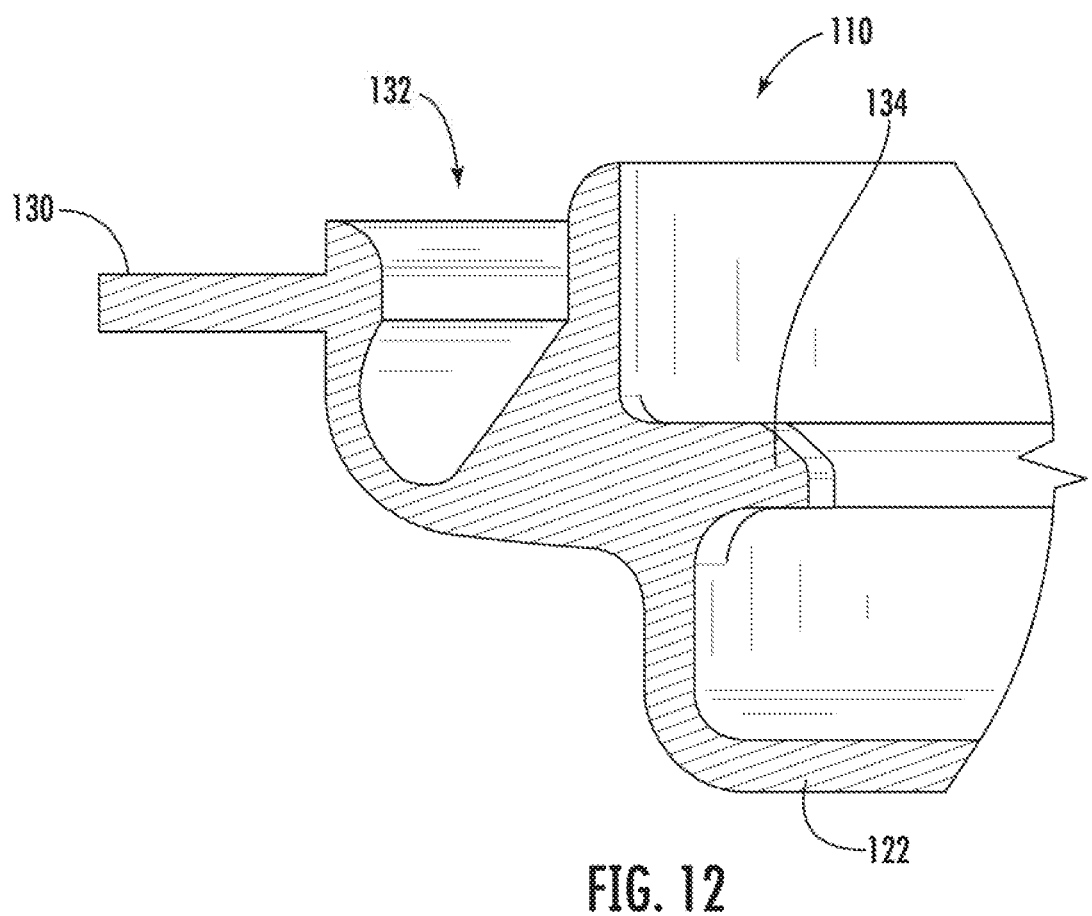
FIG. 12 is a partial section of an edge of the lid of FIGS. 7-11 illustrating both the pot securing structure and the fuel canister securing structure in greater detail.

Turning to the partial section of lid 110 shown in FIG. 12, the relative orientation of the canister attachment structure 122 relative to the side of the lid by the removal tab 130 may be seen in greater detail. Indeed, it may be seen from FIG. 12 that the lid 110 includes a groove 132 which fits over the lip of pot 108 to affix the lid thereon. On the inside of the lid 110, it may also be observed that a canister holding flange 134 is provided around the canister attachment structure 122 to securely hold the fuel canister by its base bead therein. This canister holding flange 134 securely holds the fuel canister so that it is not inadvertently dislodged during hiking or other activity once the system is fully packaged.

Figure 13:
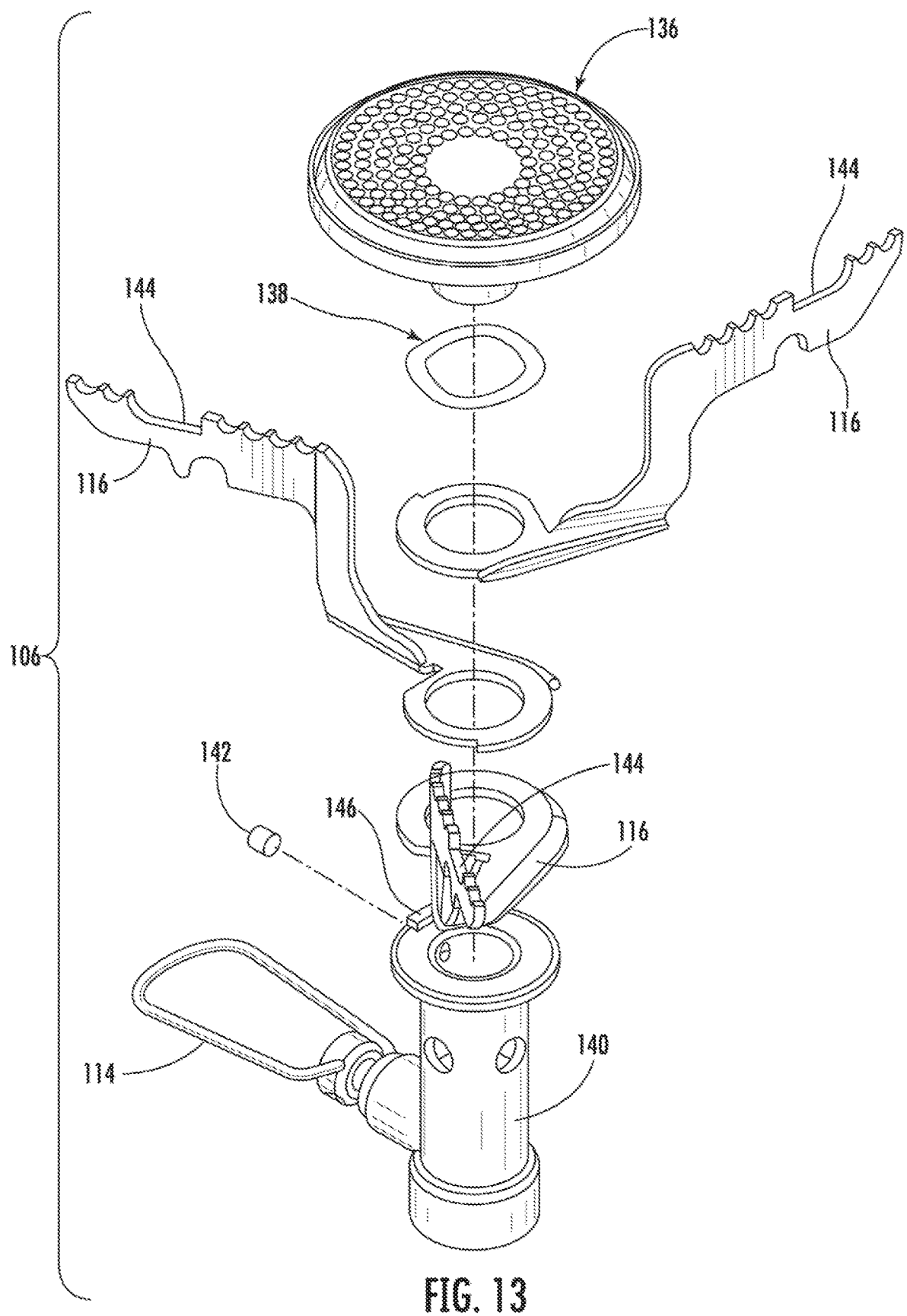
FIG. 13 is an exploded isometric illustration of an embodiment of a burner assembly of the compact packable cooking system of FIG. 1.

Turning now to FIG. 13, there is illustrated an exploded isometric view of the burner assembly 106 that shows the components thereof. As may be seen, a burner cap 136 having a plurality of gas apertures formed therein is connected through a wave spring 138 and the individual pot support legs 116 to the burner base mix tube 140. A locating pin 142 secures the burner cap 136 on the burner base mix tube 140 once assembled thereon. Each of the pot support legs 116 includes a self-centering pot land 144 to help the user properly position the included system cook pot on the pot support legs 116 while cooking. The pot support legs 116 also include a number of scallops along their support surface in order to aid in the securement of other cooking vessels that may be utilized with the system of the present invention so as to reduce the possibility of slippage of the vessels from the pot support legs 116 if utilized in a less than level situation.

Figure 14:
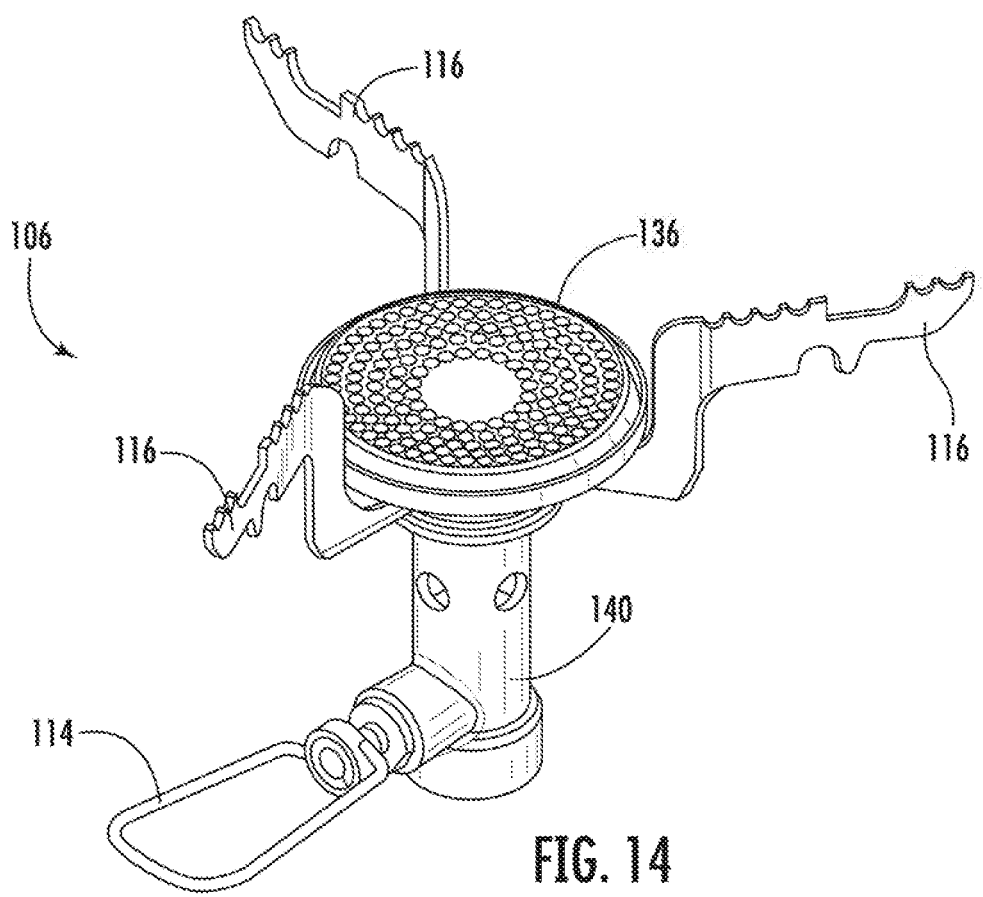
FIG. 14 is an isometric illustration of the burner assembly of FIG. 13 in its deployed configuration.
Figure 15:
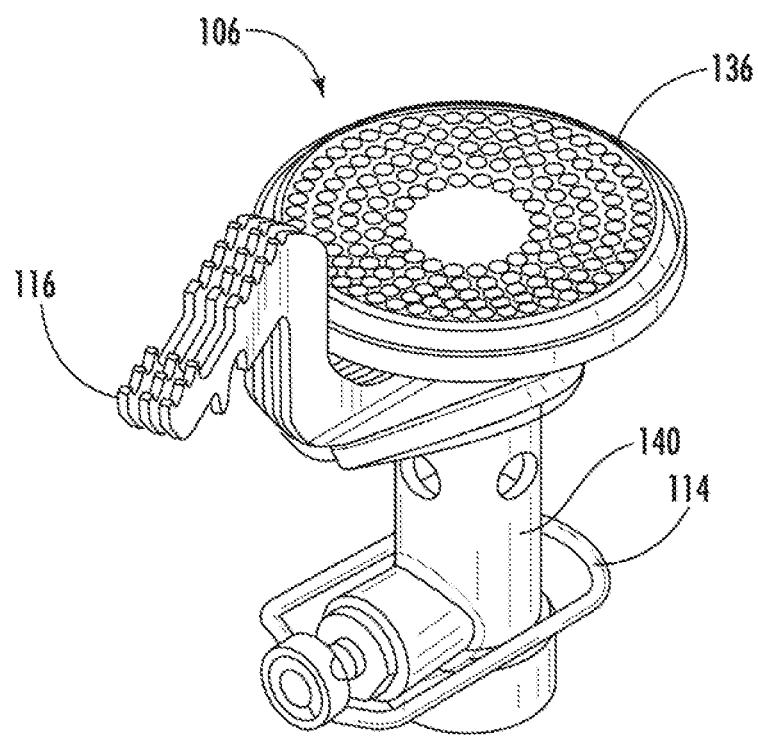
FIG. 15 is an isometric illustration of the burner assembly of FIG. 13 in its stowed configuration.

FIG. 14 illustrates the assembled burner assembly 106 with its bail 114 and pot support legs 116 showed in their deployed configuration. FIG. 15 shows the same burner assembly 106 with its pot support legs 116 rotated about the longitudinal axis of the burner assembly 106 into their stowed position. The bail 114 is also illustrated in its stowed position. While FIG. 15 illustrates the stowed configuration of the burner assembly 106 in an upright position, during storage the burner assembly 106 is flipped such that it resembles an L-shape configuration when viewed during storage.

Figure 16:
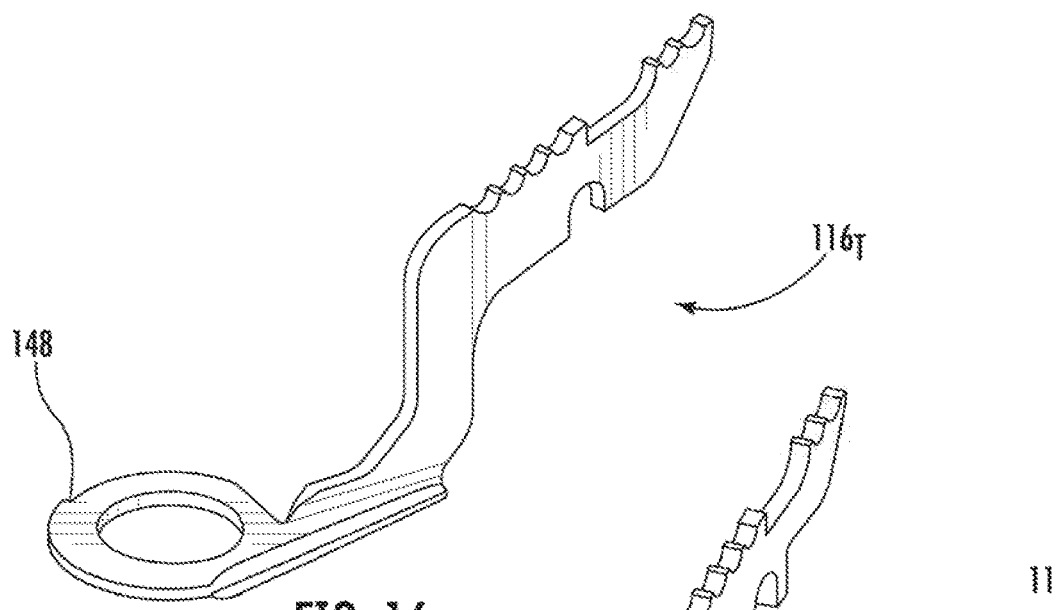
FIG. 16 is an isometric illustration of the top leg of the burner assembly of FIG. 13.
Figure 17:
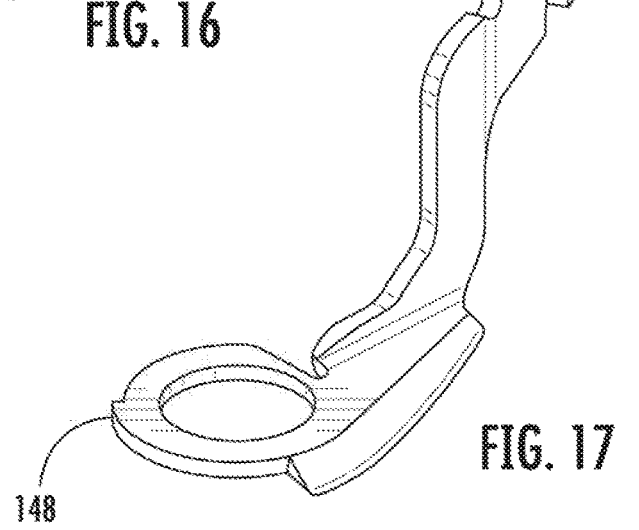
FIG. 17 is an isometric illustration of the middle leg of the burner assembly of FIG. 13.
Figure 18:
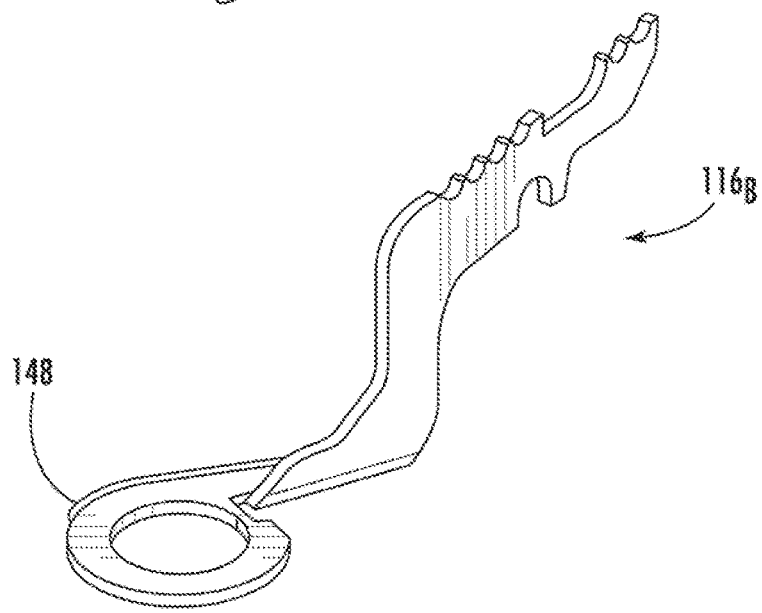
FIG. 18 is an isometric illustration of the bottom leg of the burner assembly of FIG. 13.

As may have been apparent to those skilled in the art from review of the preceding figures, each of the three pot support legs 116 have a different configuration to allow their proper nesting in the stowed position on the burner assembly. Specifically, FIG. 16 illustrates the top pot support leg $116_T$, while FIG. 17 illustrates the middle pot support leg $116_M$, and FIG. 18 illustrates the bottom pot support leg $116_B$. It is noted that the designation of top, middle, and bottom refers to the assembly order of the legs viewed with the burner-base mix tube 140 establishing the bottom and the burner cap 136 establishing the top (as shown in FIG. 13).

As may also be seen from FIGS. 16-18, each of the individual pot support legs 116 includes a locating tab 148 that encounters stop tab 146 shown in FIG. 13 when the pot support leg is rotated to its proper stowed position. In other words, the pot support legs 116 may be rotated about the longitudinal axis of the burner assembly 106 until the locating tab 148 contacts the stop tab 146. This will ensure that each of the three pot support legs 116 are properly nested so that the burner assembly 106 may be fully accommodated within the pot during the packing operation and thereafter.

Figure 20:
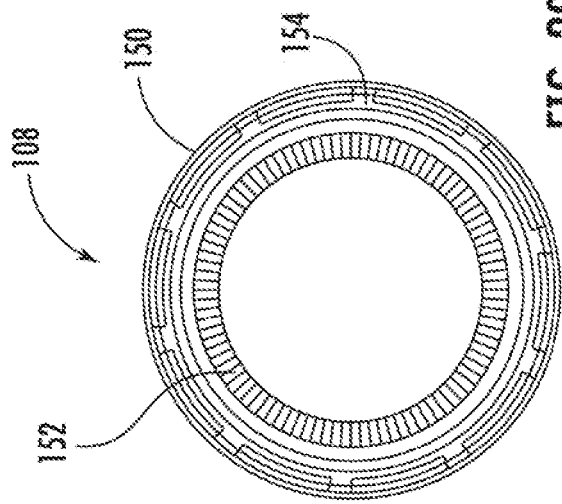
FIG. 20 is a bottom view of the cooking vessel of FIG. 19.
Figure 21:
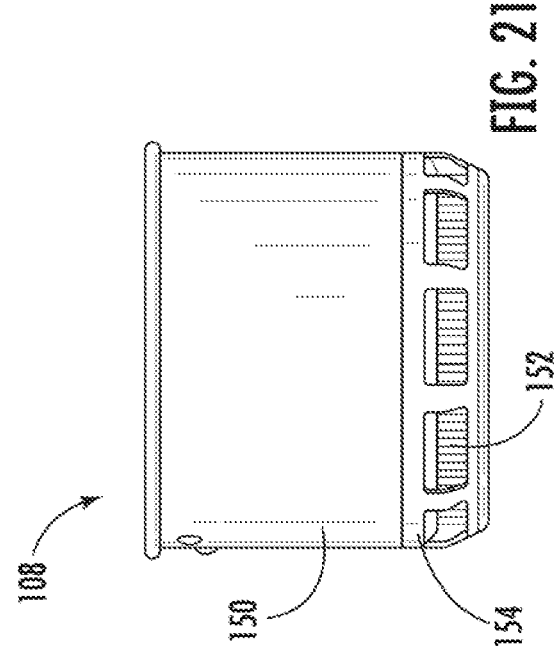
FIG. 21 is a side view of the cooking vessel of FIG. 19, fully assembled.
Figure 19:
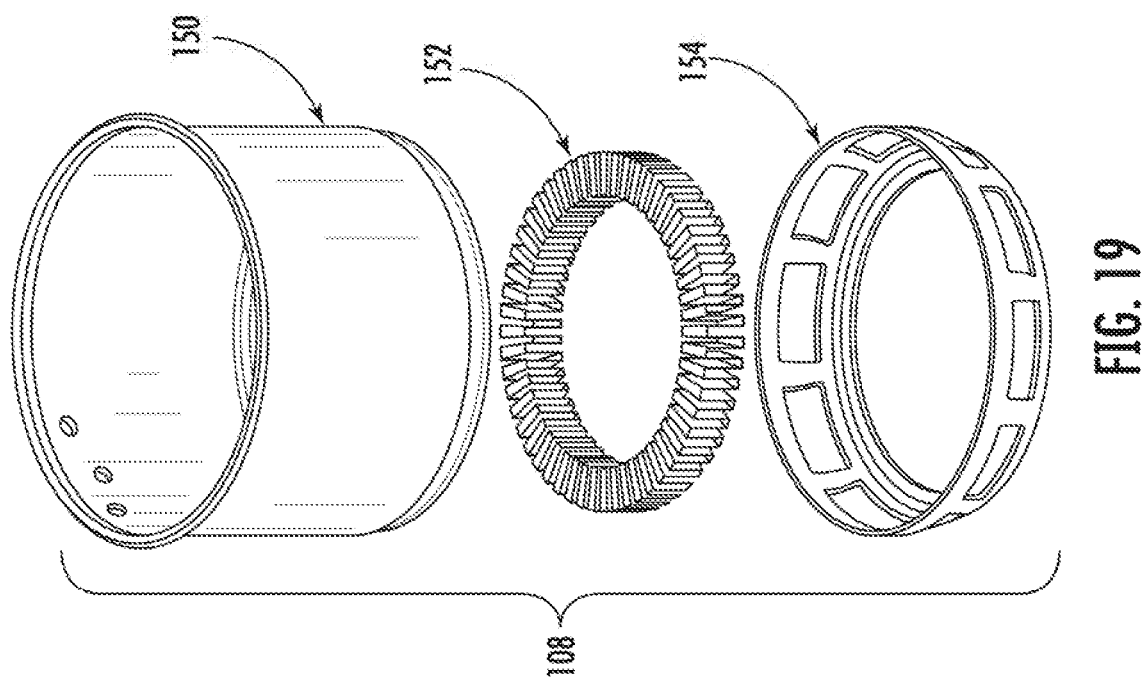
FIG. 19 is an exploded isometric illustration of an embodiment of a cooking vessel of the compact packable cooking system of FIG. 1.

FIG. 19 illustrates an exploded partial view of pot 108 showing the vessel 150, the FluxRing® heating coil 152, and the shroud 154. The bottom view of the pot 108 showing the FluxRing® heating coil 152 and the shroud 154 is illustrated in FIG. 20. FIG. 21 is a side view illustration of the assembled pot 108 illustrating these components as well.

Figure 22:
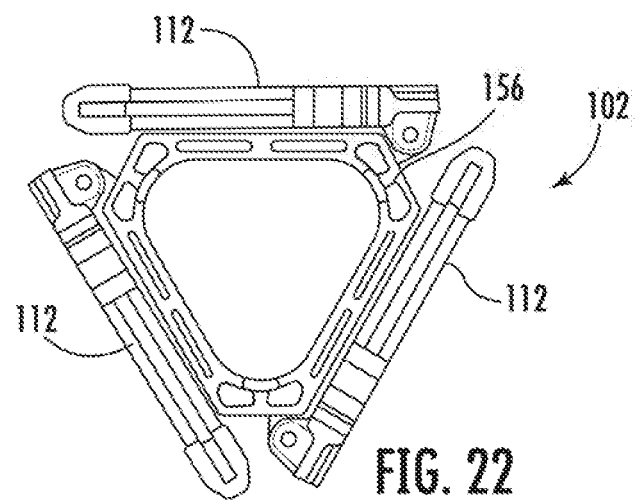
FIG. 22 is a top view illustration of an embodiment of a fuel canister stabilizer of the compact packable cooking system of FIG. 1, in its stowed configuration.
Figure 23:
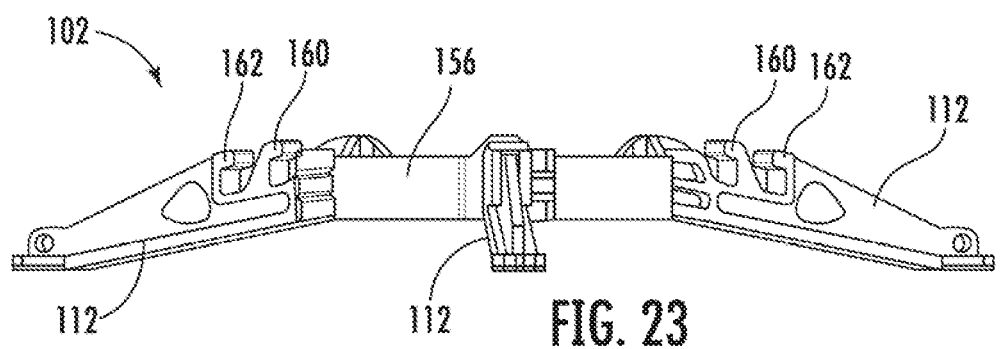
FIG. 23 is a side view illustration of the fuel canister stabilizer of FIG. 22, in its deployed configuration.
Figure 24:
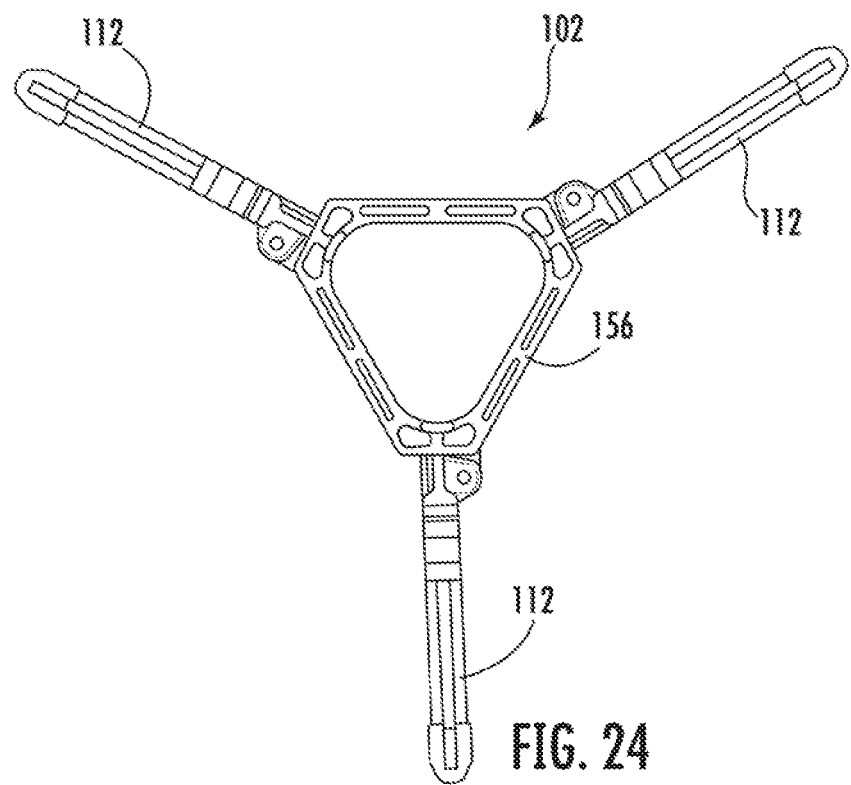
FIG. 24 is a top view illustration of the fuel canister stabilizer of FIG. 22, in its deployed configuration.

FIGS. 22-24 illustrate the fuel stabilizer 102 in a top view stowed configuration, a side view deployed configuration, and a top view deployed configuration, respectively. As may be seen in these illustrations, the fuel stabilizer 102 includes a triangular base 156 and three legs 112 rotatably attached to the corners thereof. As may best be seen in FIG. 23, each of the legs 112 include fuel canister securing tangs 160, 162 to securely attach the fuel stabilizer 102 to the two most common standard fuel canister sizes for use therewith. While additional legs may be provided, the illustrated embodiment greatly enhances the stability of the deployed cooking system by widening the contact base in order to greatly reduce the likelihood that the assembled cooking system could tip during operation, particularly when used on the ground in less than level conditions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A compact packable cooking system, comprising:
a burner assembly having at least three pot support legs that rotate around a longitudinal axis of the burner assembly into an L-shaped nested position for storage;
a pot;
a lid having a fuel canister attachment structure configured to secure a fuel canister thereto and within the pot when the lid is affixed thereto.

2. The system of claim 1, further comprising a fuel stabilizer configured to attach to a bottom of the fuel canister and having at least three legs rotatably attached to a base thereof, wherein the legs of the fuel stabilizer are configured to rotate away from the base for usage and to rotate alongside of the base for storage within the pot.

3. The system of claim 2, wherein a height of the pot is configured to provide a space between the fuel canister secured to the lid by the fuel canister attachment structure and a bottom of the pot sufficient to accommodate the fuel stabilizer therebetween.

4. The system of claim 3, wherein the burner assembly includes a burner cap and wherein the pot support legs include a pot support surface above the burner cap a distance sufficient to accommodate the fuel stabilizer when the fuel stabilizer and the pot support surface of the pot support legs are on the bottom of the pot when stored therein.

5. The system of claim 1, wherein the fuel canister attachment structure is an off-center fuel canister attachment structure that is positioned to secure the fuel canister in close proximity to an outer periphery of the lid to one side and away from the outer periphery of the lid on an opposite side so as to provide storage space to accommodate the burner assembly therebeside in the pot when the lid is affixed thereto.

6. The system of claim 1, wherein a height of the burner assembly is configured to be accommodated between a bottom wall of the pot and the lid secured thereto.

7. The system of claim 1, wherein the burner assembly includes a burner base mix tube having a stop tab, the at least three pot support legs, a wave spring, and a burner cap, and wherein each of the at least three pot support legs includes a locating tab positioned to locate each of the at least three pot support legs in a proper nested position for storage when rotated around the longitudinal axis of the burner base mix tube.

8. The system of claim 1, further comprising a lighter, and wherein the fuel canister attachment structure is configured to accommodate the lighter between the lid and the fuel canister when affixed thereto.

9. The system of claim 1, wherein each of the at least three pot support legs includes a pot land positioned in a pot support surface thereof to accommodate a bottom edge of the pot therein.

10. The system of claim 9, wherein each of the at least three pot support legs include a plurality of scallops in the pot support surface thereof.

11. The system of claim 1, further comprising the fuel canister.

12. A lid for a compact packable cooking system that includes a burner assembly having at least three pot support legs that rotate around a longitudinal axis of the burner assembly into an L-shaped nested position for storage, a pot, a fuel canister, and a fuel stabilizer, comprising a fuel canister attachment structure configured to secure the fuel canister thereto and within the pot when the lid is affixed to the pot.

13. The lid of claim 12, wherein the fuel canister attachment structure is an off-center fuel canister attachment structure that is positioned to secure the fuel canister in close proximity to an outer periphery of the lid to one side and away from the outer periphery of the lid on an opposite side so as to provide storage space to accommodate the burner assembly therebeside in the pot when the lid is affixed thereto.

14. The lid of claim 13, further comprising a pour aperture formed therethrough, and wherein the off-center fuel canister attachment structure is positioned to secure the fuel canister opposite to the pour aperture.

15. The lid of claim 14, further comprising a removal tab extending outward from the outer periphery, and wherein the off-center fuel canister attachment structure is positioned to secure the fuel canister in close proximity to the removal tab.

16. A burner assembly for a compact packable cooking system that includes a pot, a fuel canister, a fuel stabilizer, and a lid having a fuel canister attachment structure configured to secure a fuel canister thereto and within the pot when the lid is affixed thereto, comprising at least three pot support legs that rotate around a longitudinal axis into an L-shaped nested position for storage.

17. The burner assembly of claim 16, further comprising a burner cap, and wherein the pot support legs include a pot support surface above the burner cap a distance sufficient to accommodate the fuel stabilizer when the fuel stabilizer and the pot support surface of the pot support legs are on the bottom of the pot when stored therein.

18. The burner assembly of claim 16, wherein a height of the burner assembly is configured to be accommodated between a bottom wall of the pot and the lid secured thereto.

19. The burner assembly of claim 16, further comprising a burner base mix tube having a stop tab, the at least three pot support legs, a wave spring, and a burner cap, and wherein each of the at least three pot support legs includes a locating tab positioned to locate each of the at least three pot support legs in a proper nested position for storage when rotated around the longitudinal axis of the burner base mix tube.

20. The burner assembly of claim 16, wherein each of the at least three pot support legs include a pot land positioned in a pot support surface thereof to accommodate a bottom edge of the pot therein.

* * * * *